US008646992B2

(12) United States Patent
Chen et al.

(10) Patent No.: US 8,646,992 B2
(45) Date of Patent: Feb. 11, 2014

(54) RECEPTACLE STRUCTURE FOR OPTICAL SUB-ASSEMBLY FOR TRANSCEIVERS

(75) Inventors: Szu-Ming Chen, Taipei (TW); Chin-Tsung Wu, Taipei (TW)

(73) Assignee: EZConn Corporation, Taipei (TW)

( * ) Notice: Subject to any disclaimer, the term of this patent is extended or adjusted under 35 U.S.C. 154(b) by 268 days.

(21) Appl. No.: 13/295,220

(22) Filed: Nov. 14, 2011

(65) Prior Publication Data

US 2012/0288235 A1    Nov. 15, 2012

Related U.S. Application Data

(63) Continuation-in-part of application No. 13/106,075, filed on May 12, 2011.

(51) Int. Cl.
    *G02B 6/36* (2006.01)
(52) U.S. Cl.
    USPC ............................................. 385/92; 385/76
(58) Field of Classification Search
    None
    See application file for complete search history.

(56) References Cited

U.S. PATENT DOCUMENTS

| 5,315,680 | A  | * | 5/1994  | Musk et al. ........... 385/88 |
| 6,179,483 | B1 | * | 1/2001  | Kanazawa .............. 385/93 |
| 6,512,868 | B1 | * | 1/2003  | Foster et al. .......... 385/33 |
| 7,458,731 | B2 | * | 12/2008 | Chen et al. ........... 385/88 |
| 2005/0286839 | A1 | * | 12/2005 | Yoshikawa ........... 385/92 |
| 2006/0275001 | A1 | * | 12/2006 | Nakanishi et al. ..... 385/93 |
| 2007/0196057 | A1 | * | 8/2007  | Suzuki et al. ......... 385/88 |
| 2012/0288234 | A1 | * | 11/2012 | Wu et al. ............. 385/76 |
| 2012/0288236 | A1 | * | 11/2012 | Wu .................... 385/78 |
| 2012/0288237 | A1 | * | 11/2012 | Chen et al. ........... 385/78 |

* cited by examiner

*Primary Examiner* — Michele R Connelly
(74) *Attorney, Agent, or Firm* — Rosenberg, Klein & Lee

(57) ABSTRACT

A receptacle structure for optical sub-assembly for transceivers includes a receiving tube; an optical fiber; an optical fiber retainer member having an interface section and an inclined head integrally connected with the interface section, the interface section being mounted in the receiving tube with the inclined head protruding out of the receiving tube, the inclined head defining an inclined hole for receiving a front end section of the optical fiber, whereby the optical signals can be mass-accumulated and coupled to the optical fiber; a sleeve mounted in the receiving tube and the optical fiber retainer member, the sleeve being formed with an internal through hole for receiving a front end section of an optical fiber module; and a fiber stub mounted in the optical fiber retainer member and the sleeve. The fiber stub has a passageway for receiving a rear end section of the optical fiber.

6 Claims, 3 Drawing Sheets

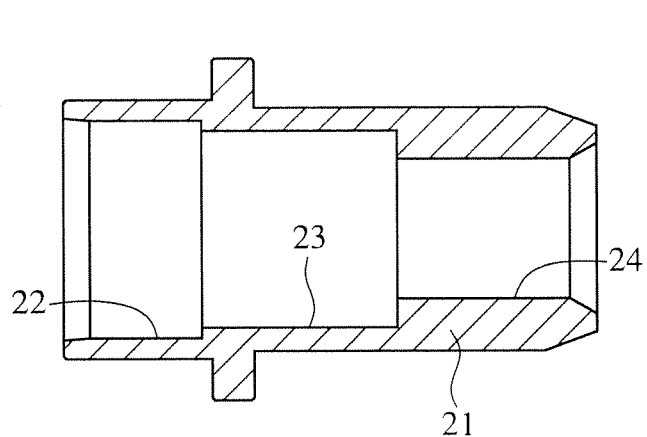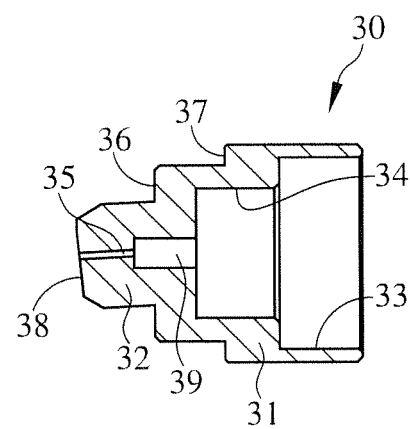
FIG.4　　　　　　　　FIG.5
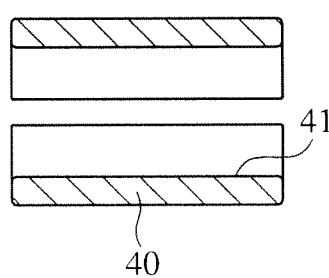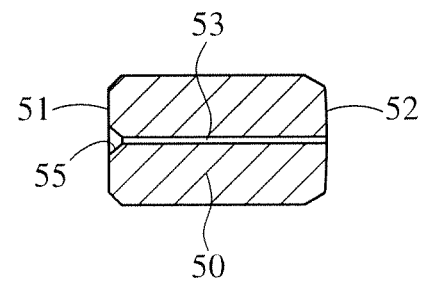
FIG.6　　　　　　　　FIG.7
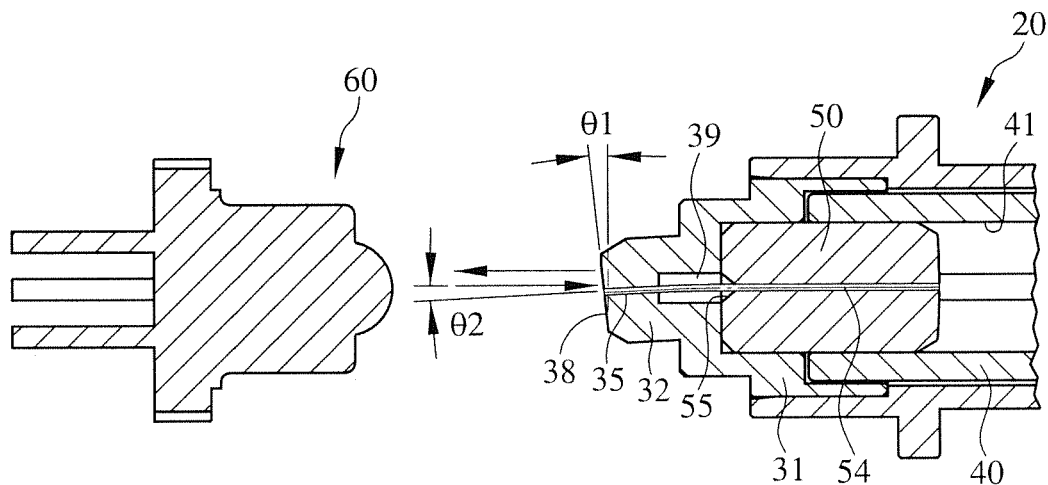
FIG.8

RECEPTACLE STRUCTURE FOR OPTICAL SUB-ASSEMBLY FOR TRANSCEIVERS

CROSS-REFERENCE TO RELATED APPLICATION

This is a continuation-in-part of application Ser. No. 13/106,075, filed 12 May 2011, which is now pending.

BACKGROUND OF THE INVENTION

1. Field of the Invention

The present invention relates generally to a receptacle structure for optical sub-assembly for transceivers. The receptacle structure includes an integrally formed optical fiber retainer member, whereby the signal loss of incident light is reduced and the manufacturing cost is lowered.

2. Description of the Related Art

In an optical fiber communication system, optical sub-assembly for transceivers is an important medium for conversion between optical signals and electrical signals. The optical sub-assembly for transceivers can be classified into transmitting optical sub-assembly (TOSA) for transmitting optical signals, bi-direction optical sub-assembly (BOSA) capable of receiving bi-direction signals in the same optical fiber and tri-direction optical sub-assembly (TRI-DI OSA) capable of receiving both digital signals and analog signals and transmitting digital signals. Either of the TOSA, BOSA and TRI-DI OSA has a receptacle structure in which an optical fiber module can be plugged to achieve optical coupling alignment for transmitting optical signals.

As shown in FIG. 1A, the receptacle structure 10 for optical sub-assembly 18 for transceivers includes a receiving tube 11, a base seat 12 coaxially disposed in the receiving tube 11 and positioned at a bottom of the receiving tube 11, a sleeve 13 coaxially disposed in the receiving tube 11 and the base seat 12, and a fiber stub 14 coaxially disposed in the base seat 12 and the sleeve 13. An optical fiber 15 is arranged in the fiber stub 14. The bottom face of the fiber stub 14 is an inclined face 16 for preventing reflection light from being incident on a light-emitting element 17 so as to avoid interference of noises with the light-emitting element 17.

Referring to FIG. 1B, as to geometrical optics, the calculation formula of angle of emergence of light beam is as follows:

$$n\,SIN(\theta1)=SIN(\theta1+\theta2), \text{wherein:}$$

n: refractive index of optical fiber;

θ1: grinding angle of optical fiber on the end face of the fiber stub; and

θ2: angle contained between the axis of optical fiber and the direction of emergence of the light.

In the above arrangement, the fiber stub 14 is disposed in the base seat 12 in an upright state. In this case, according to the above formula, the direction of incidence of optical signal of the light-emitting element 17 is collinear with the optical fiber 15 rather than coaxial with the direction of emergence of the light of the optical fiber 15. Therefore, according to the theory that an optimal path is achieved when the direction of incidence of light and the direction of emergence of light, (that is, angle of incidence of light and angle of emergence of light), are coaxial with each other, this will cause loss to incident optical signal and needs to be overcome.

SUMMARY OF THE INVENTION

A primary object of the present invention is to provide a receptacle structure for optical sub-assembly for transceivers, which is able to reduce the signal loss of incident light and greatly lower the manufacturing cost.

To achieve the above and other objects, the receptacle structure for optical sub-assembly for transceivers of the present invention includes a receiving tube, an optical fiber module being pluggable into the receiving tube to connect therewith; an optical fiber; an optical fiber retainer member having an interface section and an inclined head integrally connected with the interface section, the interface section being mounted in the receiving tube with the inclined head protruding out of the receiving tube, the inclined head defining an inclined hole for receiving a front end section of the optical fiber, the front end section of the optical fiber being disposed in the inclined head in an inclined state, whereby the optical signals can be mass-accumulated and coupled to the optical fiber; a sleeve mounted in the receiving tube and the optical fiber retainer member, the sleeve being formed with an internal through hole for receiving a front end section of the optical fiber module; and a fiber stub mounted in the optical fiber retainer member and the sleeve. The fiber stub has a passageway for receiving a rear end section of the optical fiber.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein:

FIG. 4 is a sectional view of the receiving tube of the present invention;

FIG. 5 is a sectional view of the optical fiber retainer member of the present invention;

FIG. 6 is a sectional view of the sleeve of the present invention;

FIG. 7 is a sectional view of the fiber stub of the present invention; and

FIG. 8 is a sectional view showing that the inclined head of the optical fiber retainer member of the present invention is inclined by an angle, also showing the optical paths of the incident optical signal and the emergent optical signal.

DETAILED DESCRIPTION OF THE PREFERRED EMBODIMENTS

Figure 1A:
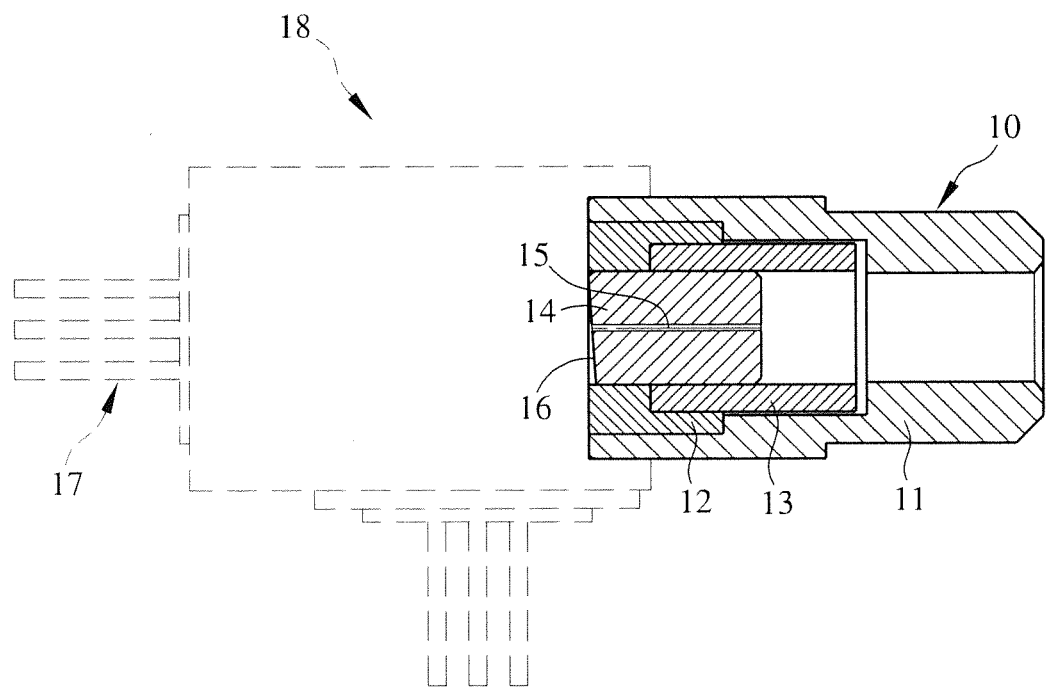
FIG. 1A is a sectional view of a conventional receptacle structure for optical sub-assembly for transceivers.
Figure 1B:
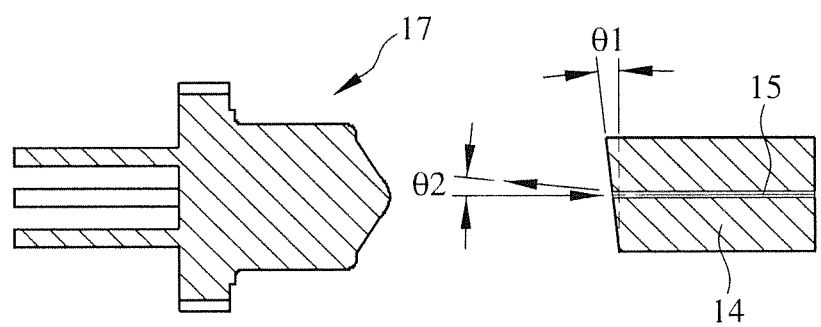
FIG. 1B is a sectional view showing that the conventional fiber stub is arranged in an upright state, also showing the optical paths of the incident optical signal and the emergent optical signal.
Figure 2:
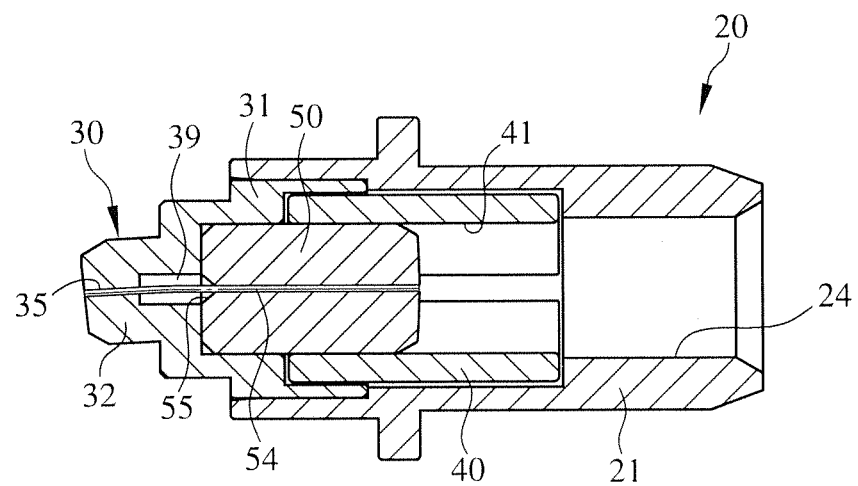
FIG. 2 is a sectional view of the receptacle structure for optical sub-assembly for transceivers of the present invention.
Figure 3:
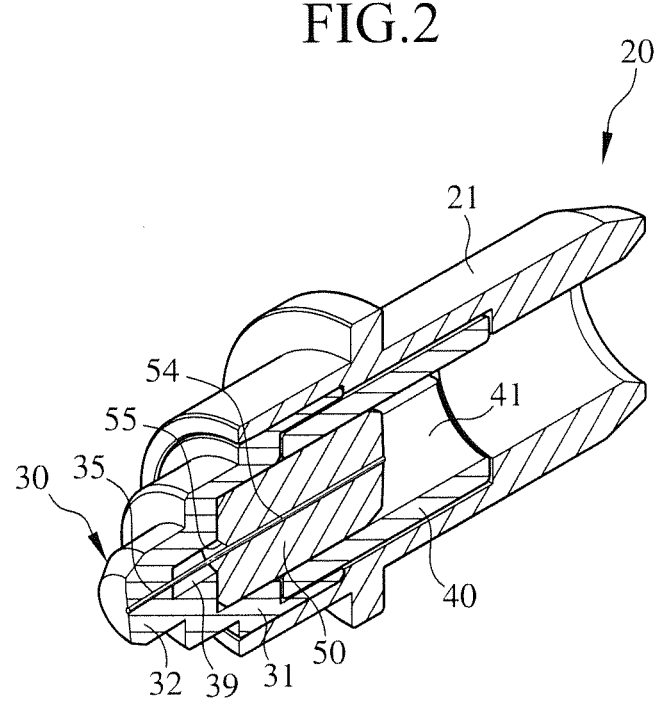
FIG. 3 is a perspective sectional view of the receptacle structure for optical sub-assembly for transceivers of the present invention.

Please refer to FIGS. 2 and 3. The receptacle structure 20 for optical sub-assembly for transceivers of the present invention includes a receiving tube 21, an optical fiber retainer member 30 disposed at a front end of the receiving tube 21, a sleeve 40 positioned in the receiving tube 21 and the optical fiber retainer member 30, a fiber stub 50 positioned in the sleeve 40 and the optical fiber retainer member 30, and an optical fiber 54 inserted in the fiber stub 50 from the optical fiber retainer member 30 and disposed in the optical fiber retainer member 30 and the fiber stub 50.

As shown in FIG. 4, the receiving tube 21 has an internal first receiving hole 22 for accommodating a part of length of the optical fiber retainer member 30, an internal second receiving hole 23 for accommodating a part of length of the sleeve 40, and an internal connection hole 24 positioned at a rear end of the receiving tube 21. An optical fiber module can be plugged into the connection hole 24 and connected with the receiving tube 21 for transmitting optical signals. The first receiving hole 22 is positioned at a front end of the receiving tube 21. The first receiving hole 22 has a diameter larger than that of the second receiving hole 23. The diameter of the second receiving hole 23 is larger than the diameter of the connection hole 24.

As shown in FIG. 5, the optical fiber retainer member 30 has an interface section 31 and an inclined head 32. The interface section 31 defines a third receiving hole 33 and a fourth receiving hole 34. The third receiving hole 33 has such a diameter as to accommodate a part of length of the sleeve 40. The fourth receiving hole 34 serves to accommodate a part of length of the fiber stub 50.

The inclined head 32 defines an inclined hole 35 and a transition section 39 in communication with the inclined hole 35 in adjacency to the fourth receiving hole 34. The inclined hole 35 has such a diameter as to accommodate a front end (inclined) section of the optical fiber 54, whereby the optical signals of the light-emitting element are coupled to the optical fiber 54. The transition section 39 permits the optical fiber 54 to gradually change, whereby when inserted from the inclined hole 35, the optical fiber 54 can gradually turn by a larger turn radius. The inclined head 32 is formed with a first annular shoulder section 36 and a second annular shoulder section 37.

The inclined head 32 has a front end face, which is an inclined face 38 for preventing reflection light from being directly incident upon the light-emitting element so as to avoid interference of noises with the light-emitting element.

As shown in FIG. 6, the sleeve 40 is formed with an internal through hole 41 for receiving the front end section of the optical fiber module and the rear end section of the fiber stub 50.

As shown in FIG. 7, the fiber stub 50 has a front face 51 and a rear face 52 opposite to the front face 51 and a passageway 53 axially extending between the front and rear faces 51, 52. The passageway 53 serves to receive a rear end (not inclined) section of the optical fiber 54.

The front end of the passageway 53 has a conic optical fiber guide hole 55. When the optical fiber 54 extends from the transition section 39 to the optical fiber guide hole 55, the top end of the optical fiber 54 can extend along the inner wall face of the optical fiber guide hole 55 into the passageway 53.

The inclined head 32 of the optical fiber retainer member 30 is integrally connected with the interface section 31 by means of metal powder injection to form an integrated structure. This can reduce signal loss of incident light and greatly lower manufacturing cost. Moreover, the front end section of the optical fiber 54 is disposed in the inclined hole 35 of the inclined head 32 in an inclined state. Therefore, the direction of emergence of the light is coaxial with the direction of incidence of the light to meet the calculation formula of angle of emergence of light beam. Therefore, the optical signals emitted from the light-emitting element 60 can be mass-accumulated and coupled to the optical fiber 54 in the inclined head 32 to reduce coupling loss and greatly increase optical coupling efficiency. As shown in FIG. 8, the inclined head 32 is inclined by an angle θ2 for rectifying the direction of emergence of the light from the inclined head 32 to be coaxial with the direction of incidence of the light emitted from the light-emitting element 60. In this case, a best optical coupling efficiency can be achieved.

The above embodiments are only used to illustrate the present invention, not intended to limit the scope thereof. It is understood that many changes or modifications of the above embodiments can be made by those who are skilled in this field without departing from the spirit of the present invention. The scope of the present invention is limited only by the appended claims.

What is claimed is:

1. A receptacle structure for optical sub-assembly for transceivers, an optical fiber module being pluggable into the receptacle structure to optically connect therewith for transmitting optical signals, the receptacle structure comprising:
   a receiving tube having an internal first receiving hole at a front end, an internal second receiving hole and an internal connection hole at a rear end, in which the optical fiber module can be plugged to connect with the receiving tube;
   an optical fiber having a front end section and a rear end section;
   an optical fiber retainer member having an interface section and an inclined head integrally connected with the interface section, the interface section being mounted in the first receiving hole of the receiving tube with the inclined head protruding out of the receiving tube at front end of the optical fiber retainer member, the interface section defining a third receiving hole and a fourth receiving hole, the inclined head defining an inclined hole for receiving the front end section of the optical fiber, the front end section of the optical fiber being disposed in the inclined head in an inclined state, whereby the optical signals can be mass-accumulated and coupled to the optical fiber;
   a sleeve mounted in the second receiving hole of the receiving tube and the third receiving hole of the optical fiber retainer member, the sleeve being formed with an internal through hole for receiving a front end section of the optical fiber module; and
   a fiber stub mounted in the fourth receiving hole of the optical fiber retainer member and the through hole of the sleeve, the fiber stub having a passageway for receiving the rear end section of the optical fiber.

2. The receptacle structure for optical sub-assembly for transceivers as claimed in claim 1, wherein the inclined head further includes a transition section in communication with the inclined hole of the inclined head in adjacency to the fourth receiving hole of the interface section.

3. The receptacle structure for optical sub-assembly for transceivers as claimed in claim 2, wherein a front end of the passageway of the fiber stub has a conic optical fiber guide hole.

4. The receptacle structure for optical sub-assembly for transceivers as claimed in claim 1, wherein a front end of the passageway of the fiber stub has a conic optical fiber guide hole.

5. The receptacle structure for optical sub-assembly for transceivers as claimed in claim 1, wherein the inclined head is formed with a first annular shoulder section and a second annular shoulder section.

6. The receptacle structure for optical sub-assembly for transceivers as claimed in claim 1, wherein the front end face of the inclined head is an inclined face.

* * * * *